US010860461B2

(12) United States Patent
Mevorach et al.

(10) Patent No.: US 10,860,461 B2
(45) Date of Patent: Dec. 8, 2020

(54) PERFORMANCE UTILITIES FOR MOBILE APPLICATIONS

(71) Applicant: Transform SR Brands LLC, Hoffman Estates, IL (US)

(72) Inventors: Yonatan Mevorach, Rishon Lezion (IL); Gil Fuchs, Redwood City, CA (US); Edward Lampert, Bay Harbor, FL (US); Eui Chung, Huntley, IL (US); Moti Karmona, Hod Hasharon (IL); Shani Raba, Rishon Lezion (IL); Netanel Lev, Petah Tikva (IL); Amit Goldshmidt, Herzliya (IL); Eric Rabinovich, Herzliya (IL)

(73) Assignee: Transform SR Brands LLC, Hoffman Estates, IL (US)

( * ) Notice: Subject to any disclaimer, the term of this patent is extended or adjusted under 35 U.S.C. 154(b) by 0 days.

(21) Appl. No.: 15/598,099

(22) Filed: May 17, 2017

(65) Prior Publication Data

US 2018/0210814 A1    Jul. 26, 2018

Related U.S. Application Data

(60) Provisional application No. 62/449,784, filed on Jan. 24, 2017.

(51) Int. Cl.
G06F 9/44     (2018.01)
G06F 9/45     (2006.01)
G06F 11/36    (2006.01)

(52) U.S. Cl.
CPC ...... *G06F 11/3644* (2013.01); *G06F 11/3612* (2013.01); *G06F 11/3688* (2013.01)

(58) Field of Classification Search
CPC ............. G06F 11/3612; G06F 11/3644; G06F 11/3688
See application file for complete search history.

(56) References Cited

U.S. PATENT DOCUMENTS 9,015,654 B2 * 4/2015 Kaasila ............... G06F 11/3664
                                                        702/186
9,135,151 B2 * 9/2015 Betak .................. G06F 11/3692
(Continued)

FOREIGN PATENT DOCUMENTS

CN        104679649 A  *  6/2015
CN        106371998 A  *  2/2017
(Continued)

OTHER PUBLICATIONS

María Gómez, Mining Test Repositories for Automatic Detection of UI Performance Regressions in Android Apps, 2016, pp. 1-12. https://ieeexplore.ieee.org/stamp/stamp.jsp?tp=&arnumber=7832883 (Year: 2016).*
(Continued)

*Primary Examiner* — Mongbao Nguyen
(74) *Attorney, Agent, or Firm* — McAndrews, Held & Malloy, Ltd.

(57) ABSTRACT

Techniques for evaluating software systems are provided, including measurement of performance ratings of features of an app-under-test are described. The evaluation may include analysis of a video recording of the user interface of the app-under-test, where the video analysis may include comparing the changes over time of co-located pixel in the video to produce a performance rating, for example a speed index. The results of multiple such tests can be compared by comparing the performance rating produced during execution of different tests.

15 Claims, 10 Drawing Sheets

(56) References Cited

U.S. PATENT DOCUMENTS

| | | | | |
|---|---|---|---|---|
| 9,152,541 | B1* | 10/2015 | Kuo | G06F 11/3672 |
| 9,195,829 | B1* | 11/2015 | Goradia | G06F 11/362 |
| 9,697,108 | B2* | 7/2017 | Ligman | G06F 11/3688 |
| 9,747,191 | B1* | 8/2017 | Marolia | G06F 11/3664 |
| 10,114,733 | B1* | 10/2018 | Varghese | G06F 11/3664 |
| 2002/0012520 | A1 | 1/2002 | Nagasaka et al. | |
| 2005/0254775 | A1 | 11/2005 | Hamilton et al. | |
| 2009/0006966 | A1 | 1/2009 | Bodin et al. | |
| 2011/0131551 | A1* | 6/2011 | Amichai | G06F 11/3668 717/125 |
| 2012/0240061 | A1 | 9/2012 | Hillenius et al. | |
| 2013/0326467 | A1* | 12/2013 | Nair | G06F 11/3664 717/101 |
| 2014/0047417 | A1* | 2/2014 | Kaasila | G06F 11/3664 717/135 |
| 2015/0012838 | A1* | 1/2015 | Hegstad | H04W 4/00 715/745 |
| 2015/0026665 | A1* | 1/2015 | Chen | G06F 11/3688 717/124 |
| 2015/0082280 | A1* | 3/2015 | Betak | G06F 11/3692 717/124 |
| 2015/0161031 | A1* | 6/2015 | Chea | G06F 11/3664 717/125 |
| 2015/0326455 | A1* | 11/2015 | Hui | G06F 3/0481 715/736 |
| 2015/0339213 | A1* | 11/2015 | Lee | G06F 11/3664 717/125 |
| 2016/0139775 | A1* | 5/2016 | Segal | G06F 3/04842 715/716 |
| 2016/0301732 | A1* | 10/2016 | Moretto | H04L 43/50 |
| 2017/0139812 | A1* | 5/2017 | Cai | G06F 11/3664 |
| 2017/0147480 | A1* | 5/2017 | Lachwani | G06F 11/3684 |
| 2017/0201779 | A1* | 7/2017 | Publicover | H04W 4/21 |
| 2017/0220972 | A1* | 8/2017 | Conway | G01D 21/00 |
| 2017/0277625 | A1* | 9/2017 | Shtuchkin | G06F 11/3688 |
| 2017/0347091 | A1* | 11/2017 | Madhani | G06T 7/001 |
| 2020/0034281 | A1* | 1/2020 | Hamid | G06F 11/3684 |

FOREIGN PATENT DOCUMENTS

| | | | |
|---|---|---|---|
| WO | WO 2015/135043 A1 | 9/2015 | |
| WO | WO-2016206113 A1 * | 12/2016 | G06F 11/3664 |

OTHER PUBLICATIONS

Raphael Pham, Beyond Plain Video Recording of GUI Tests, 2012, pp. 103-109. https://dl.acm.org/doi/pdf/10.5555/2663608.2663629 (Year: 2012).*

Xi Li, Enhancing Quality of Experience (QoE) Assessment Models for Video Applications, 2013, pp. 1-4. https://ieeexplore.ieee.org/stamp/stamp.jsp?tp=&arnumber=6548959&isnumber=6548948 (Year: 2013).*

"Test a website's performance"; https://www.webpagetest.org/; WebPageTest; accessed Jun. 8, 2017; 1 page.

"Speed Index"; https://sites.google.com/a/webpagetest.org/docs/using-webpagetest/metrics/speed-index; WebPageTest Documentation; accessed Jun. 8, 2017; 10 pages.

International Patent Application No. PCT/US2018/015106; Int'l Search Report and the Written Opinion; dated Apr. 17, 2018; 14 pages.

International Patent Application No. PCT/US2018/015106; Int'l Preliminary Report on Patentability; dated Aug. 8, 2019; 9 pages.

* cited by examiner

| COMPARE | VIDEO | DATE/TIME | NAME | SPEED INDEX | LAST VISUAL CHANGE |
|---|---|---|---|---|---|
| ☐ | 160812_RY_6MCJK | 12/08/16 18:17(UTC) | IOS_IPHONE6_SYW_BROWSEDEPARTMENTSPAGE.MP4 | 6668 | 7986 |
| ☐ | 160812_RKMIZ9OT | 12/08/16 18:17(UTC) | IOS_IPHONE6_SYW_SEARCHRESULTSPAGE.MP4 | 6435 | 8084 |
| ☐ | 160812_BJTUG9SK | 12/08/16 18:16(UTC) | IOS_IPHONE6_SYW_PRODUCTSPAGE.MP4 | 3924 | 5034 |
| ☐ | 160812_BKFIFCSY | 12/08/16 18:15(UTC) | IOS_IPHONE6_SYW_ACTIVITYCENTERPAGE.MP4 | 4151 | 5634 |
| ☐ | 160812_HYSVZ9SK | 12/08/16 18:15(UTC) | IOS_IPHONE6_SYW_OTHERUSERPROFILEPAGE.MP4 | 4355 | 6501 |
| ☐ | 160812_BK1EM9OF | 12/08/16 18:15(UTC) | ANDROID_NEXUS4_BENCHMARK_KMART_LAUNCH.MP4 | 2327 | 9108 |
| ☐ | 160812_SJABM9JK | 12/08/16 18:14(UTC) | IOS_IPHONE6_SYW_USERPROFILEPAGE.MP4 | 4533 | 5571 |
| ☐ | 160812_SJCKFOOT | 12/08/16 18:13(UTC) | IOS_IPHONE6_SYW_REWARDSPAGE.MP4 | 4691 | 5534 |
| ☐ | 160812_SK1O-9SK | 12/08/16 18:13(UTC) | ANDROID_NEXUS4_BENCHMARK_SEARS_LAUNCH.MP4 | 2844 | 9099 |
| ☐ | 160812_SKE6-QOF | 12/08/16 18:13(UTC) | IOS_IPHONE6_SYW_CATALOGPAGE.MP4 | 7595 | 8718 |
| ☐ | 160812_RY35ZQIF | 12/08/16 18:12(UTC) | IOS_IPHONE6_SYW_LAUNCH.MP4 | 4288 | 6518 |
| ☐ | 160812_HYDDBQIT | 12/08/16 18:12(UTC) | IOS_IPHONE6_BENCHMARK_FOUNT_LAUNCH.MP4 | 8127 | 9068 |
| ☐ | 160812_BKFDWQIT | 12/08/16 18:11(UTC) | ANDROID_NEXUS4_BENCHMARK_PERSONALSHOPPER_CONVERSATIONPAGE.MP4 | 246 | 8584 |
| ☐ | 160812_R1RSWQSF | 12/08/16 18:11(UTC) | IOS_IPHONE6_BENCHMARK_KMART_LAUNCH.MP4 | 8776 | 14701 |
| ☐ | 160812_H1ONBQSY | 12/08/16 18:11(UTC) | ANDROID_NEXUS4_BENCHMARK_PERSONALSHOPPER_LAUNCH.MP4 | 409 | 2959 |
| ☐ | 160812_BKRO-OST | 12/08/16 18:10(UTC) | IOS_IPHONE6_BENCHMARK_SEARS_LAUNCH.MP4 | 7606 | 11268 |
| ☐ | 160812_SYOZB5IK | 12/08/16 18:10(UTC) | ANDROID_NEXUS4_BENCHMARK_SHOPYOURWAYRELAY_LAUNCH.MP4 | 2280 | 8834 |
| ☐ | 160812_H1PX-5SK | 12/08/16 18:10(UTC) | IOS_IPHONE6_BENCHMARK_PERSONALSHOPPER_CONVERSATIONPAGE.MP4 | 8549 | 9401 |
| ☐ | 160812_HK4CX9JF | 12/08/16 18:09(UTC) | IOS_IPHONE6_BENCHMARK_PERSONALSHOPPER_LAUNCH.MP4 | 9221 | 10334 |
| ☐ | 160812_RYFCG5IK | 12/08/16 18:09(UTC) | ANDROID_NEXUS4_BENCHMARK_ALIEXPRESS_LAUNCH.MP4 | 2702 | 4277 |
| ☐ | 160812_RIDILCJF | 12/08/16 18:08(UTC) | IOS_IPHONE6_BENCHMARK_SHOPYOURWAYRELAY_LAUNCH.MP4 | 6366 | 13085 |
| ☐ | 160812_SYG5ECOT | 12/08/16 18:08(UTC) | ANDROID_NEXUS4BENCHMARK_AMAZON_LAUNCH.MP4 | 5475 | 7932 |

Fig. 8

PERFORMANCE UTILITIES FOR MOBILE APPLICATIONS

CROSS REFERENCE TO RELATED APPLICATIONS

This application claims benefit under 35 U.S.C. § 119(e) of Provisional U.S. Patent Application No. 62/449,784, filed Jan. 24, 2017, the contents of which is incorporated herein by reference in its entirety.

BACKGROUND

Test processes for software systems are often automated to provide an easily repeatable test to enable, for example, easy comparison between different software systems or two different versions of the same software system. In the development process for a software system, regression testing can help to identify a bug introduced in a new version of the software system by comparing test results of the new version to an older version and noting a test result that has unexpectedly gotten worse with the new version. Alternately, a similar feature of two different software systems can be compared. An automated functional test of a software system may include test software, separate from the software system being tested, that causes execution of one or more functions of the software system being tested without requiring a human to initiate each of the functions being tested. Functional test systems may record or evaluate the output or performance of the software under test in response to initiating the tested functions. For example, performance may be recorded by measuring how long a software system being tested takes to perform one or more functions.

A software system with a human user interface (UI), often called a software application or simply "app," can be tested with functional test tools. A functional test system for a user interface may simulate a human user's input to the UI of the software under test, and may analyze or record the response of the software system to the simulated human input. One measure of the quality of an app is the speed with which an app's UI is changed in response to user input. The UI speed performance of an app can be measured with functional test software by, for example, noting the start and finish times of an update to an app's UI, or noting the time between a user's request (or a simulated request) for an update to an app UI and the completion of the requested UI update.

An app is software that provides functionality to an end user via a user interface. The functionality might be an online shopping experience or mobile banking experience. An app might be native app comprising software installed onto the end user's computer device such as a mobile phone, or an app may be a web app comprising a web site without the need to install native software onto the user's device. The end user's device is the host device for a native app, while a server for a web site may be the host device for a web app.

BRIEF DESCRIPTION OF THE DRAWINGS

FIG. 8 is an example list of tests with speed index ratings.

DETAILED DESCRIPTION OF ILLUSTRATIVE EMBODIMENTS

Figure 1:
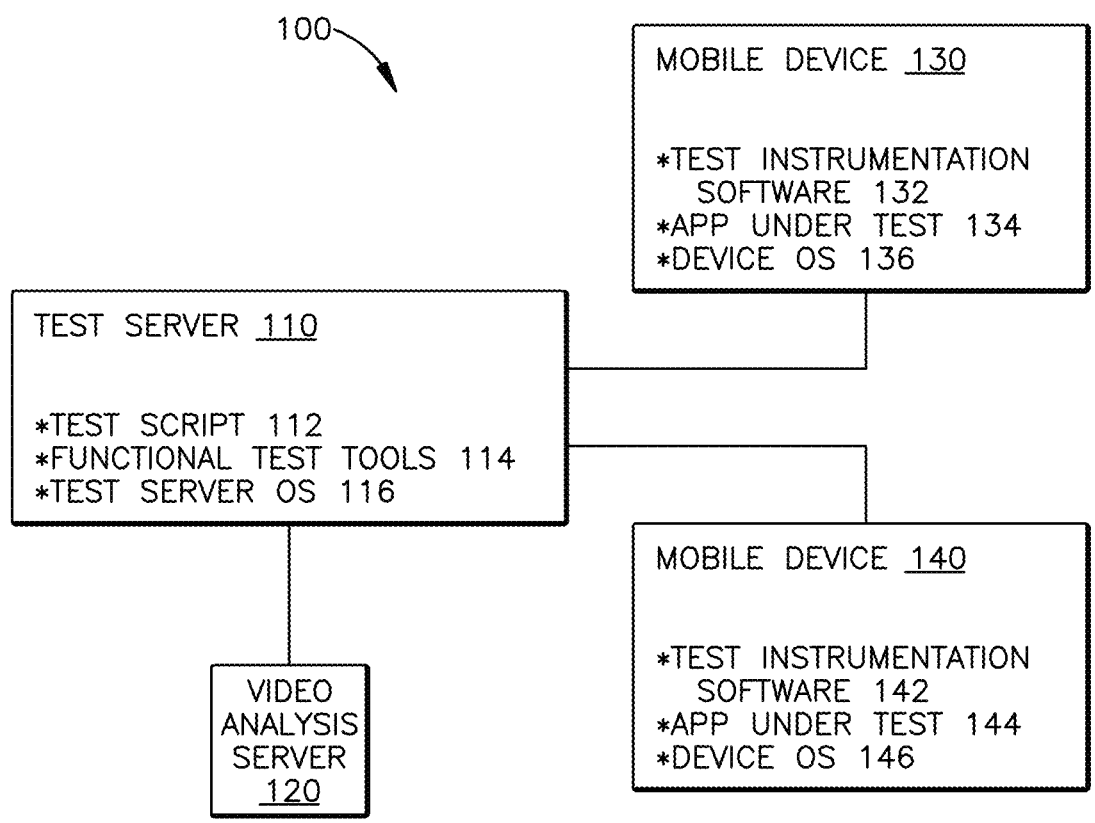
FIG. 1 depicts an example system for software user interface performance testing.

Software quality can be measured by analyzing a progression of user interface changes over time. In the case of software with a visual user interface, a video recording of the user interface changes over time can be analyzed to estimate software quality. Functional test tools can be used to initiate execution of features of a mobile device app while simultaneously record a video of the user interface changes for the app during execution of the initiated features. The recorded video may be saved for later analysis and evaluation or analyzed in real-time on a computing device. A performance rating may be determined from the video analysis, and the performance ratings resulting from multiple executions of a functional test can be compared.

Video-based quality analysis of a user interface may better account for a user's subjective experience with software by estimating a perceived performance that accounts for partial completion of tasks as compared to measuring only duration to fully complete a task. A user's subjective experience may be dependent not just on the total time the software takes to complete a task, but may be based in part on the distribution of different portions of the task over the time to complete the task. For example, two implementations of a task in an app may take the same total time duration to complete. In the first implementation, a portion of the task that is most relevant to the user is completed early in the duration of the task, while other less relevant portions of the task are complete later. In the second implementation, less relevant portions of a task are completed first, and the most relevant portion is completed last. Even though both implementations of the task require the same total duration to complete, the user's subjective experience may be that the first implementation is faster and hence higher quality than the second implementation because the most relevant portion of the task is completed sooner. A quality comparison of the two implementations based on the total time to complete the task would rate both implementations equally. An improved quality comparison can be made by estimating a user's perception of app performance throughout the execution of the task. A user's perception can be estimated by analyzing a video of the progression of visual changes to the app's user interface. Such as video-based comparison may rate the first implementation higher than the second based on the completion of the most relevant portion of the task as perceived visually through the user interface.

An example is a mobile banking app. The banking app may have a balance function for querying a server to determine the balance of three bank accounts, and then displaying the three balances simultaneously on a screen. If an app user would like to know the balance of one of the accounts and uses the balance function to determine that balance, the user's perceived speed of the app may be based on when the balance he or she was interested in appears on the screen of his mobile device, while the time that the other two balances appear may not be relevant to the user, and the total time for the balance function to complete displaying all three balances may also be irrelevant to the user. A test system can record a video of the app's visual user interface starting at the time of either the launching of the banking app or the initiation of the balance function within the app. A test system that is structured to rank the importance of the three balances to a user or type of user can analyze the video to determine the time duration from the launching of the app or the initiation of the balance function within the app until the time that the display in the UI of the highest ranked balance was completed. The duration until the most important part of a UI is completed may be an estimate of a user's subjective quality of the balance function of the app being tested. Note that delays due to the server providing the balance, delay in the network or Internet between that server and test mobile device, and delays due to processing or displaying the balance on the screen of the test mobile device may all be included in this duration measurement. An estimate of user subjective quality comparison can then be determined by comparing the test results of different apps or different version of the same app with a similar balance function.

After comparing two apps, such as by estimating subjective quality of a similar feature of two apps, a variety of actions can be taken based on the comparison. For example, a recommendation can be made to use or install the more highly rated app. In the case of comparison of two similar apps on two different platforms (e.g. Android vs. iOS), a recommendation can be made for a preferred platform. In the case of evolving software development of with new versions of a single app on a single platform, the different versions of that same app can be compared, and a notification or alert raised automatically when a newer version has a performance rating lower than an older version, perhaps indicating that a bug was introduced with the newer version of the app.

FIG. 1 depicts an example system 100 for software user interface performance testing. Test server 110 may be connected by a computer network to mobile devices 130, 140 and to video analysis server 120. Test server 110 may comprise test scripts 112, functional test tools 114, and test server operating system 116. Test script 112 may be tailored to particular mobile devices, apps, functions, or features of an app to be tested. Functional test tools 114 may provide generic features for connecting test server script 112 to mobile devices 130, 140. Test server operating system 116 may provide services to, or an operating environment for, the test script 112 and functional test tools 114.

Mobile devices 130, 140 may include test instrumentation software 132, 142, the apps under test 134, 144, and device operating systems 136, 146. Mobile devices 130, 140 may be smartphones, for example. Test instrumentation software 132, 142 may be closely integrated with the functional test tools 114 on the test server 110. Test instrumentation software, such as 132 and 142, may be generic to (not customized for) any use of the functional test tools 114 and any test script 112. Alternately, test instrumentation software 132, 142 may be customized to the specific mobile devices 130, 140 and/or the specific apps under test 134, 144. Test instrumentation software may comprise a stand-alone test app (that is an app comprising software for testing a separate app-under-test), may be integrated with the apps under test 134, 144, may be integrated with the device OS 136, 146, or may be some combination thereof. Integration of test instrumentation software 132, 142 with an app or OS may be done, for example, by statically or dynamically linking of a test instrumentation object code library with the app or OS, respectively. Device operating systems 136, 146 may provide services to, or an operating environment for, an app-under-test 134, 144. Test instrumentation software 132, 142, may be able to cause the recording of the UI of the app-under-test 134, 144, for example by recording the display screen of the mobile device, or portion thereof, as video data.

In the embodiment of FIG. 1, mobile devices 120 and 140 are separate devices (not the same physical device). Mobile devices 130 and 140 may be different platforms in that device hardware, operating system, and/or app-under-test may be different, and the test instrumentation software may be different for each device corresponding to the differences in hardware, operating system, and/or apps. In other embodiments (not depicted), testing may occur by running multiple tests on a single physical device. For example the same device may be used to run tests on two different versions of the same app-under-test. In other embodiments, the apps-under-test may be very different, for example two different apps-under-test may not share any source code, but both apps-under may implement one or more of the same features. For example a FACEBOOK app and a LINKEDIN app may both have a feature for listing a member's friends or connections. Such embodiments may provide a numeric comparison, for example, between similar features of competitor apps. When comparing features that are similar or the same of apps that are different, it may be preferable to run the all comparison tests on the same device.

Performance measurement of an app's UI may include all user interface elements of an app, or only a portion of the app's UI. For example, a performance estimate may be made from a video of an app's UI as the app progresses through an entire work flow of a particular user task, where the work flow may include several different portions of the app's user interface, such as a home screen, a menu pop-up, an option-selection screen, and a results screen displaying results determined by the options selected in the option-selection screen. A performance estimate of a feature of an application may include any portion of an app's UI that is desired to be measured. In some cases, a feature may include all steps in a work flow, while in others a feature may only include one stage of a work flow, such only the presentation of the results screen in the example above. When comparing the same features of different apps, the features being measured may include the portions of the user interfaces of the different apps that service a similar purpose from some point of view. For example, a listing of FACEBOOK friends and a listing of LINKEDIN connections may serve a similar purpose from an app user's point of view.

Recorded video of the UI of the app-under-test may be sent from the mobile devices 130, 140 to the test server 110 and/or video analysis server 120. Video analysis server 120 may detect changes in the app UI over time by analyzing the video recording. Video analysis server 120 may then evaluate the UI performance based on the detected UI changes, and return the results of this analysis back to the test server 110. Video analysis may include determining when visual changes stop happening, determining a percentage of change for each frame of video, and determining a perceived performance rating. For example, perceived performance may be estimated with a speed rating. The time when visual changes stop happening may be determined by the time (along the timeline of the captured video) of the frame containing the last change in any pixel of the video—the first frame for which every subsequent frame is identical for every corresponding pixel. The percentage change for any particular frame of the video may be determined, for example, by calculating the percentage of pixels in that particular frame that are identical to the last frame in the video. A perceived speed rating may be calculated, for example, as the area under a graph of (the integral of) the percentage change over time. A perceived speed rating may be called a Speed Index. In some embodiments, video analysis server 120 may be the GOOGLE SpeedTest cloud service. A perceived performance rating may also include measures in addition to, or instead of, a visual speed rating, such as the speed with which the user interface become interactive or functional again after a previous user input.

Figure 2:
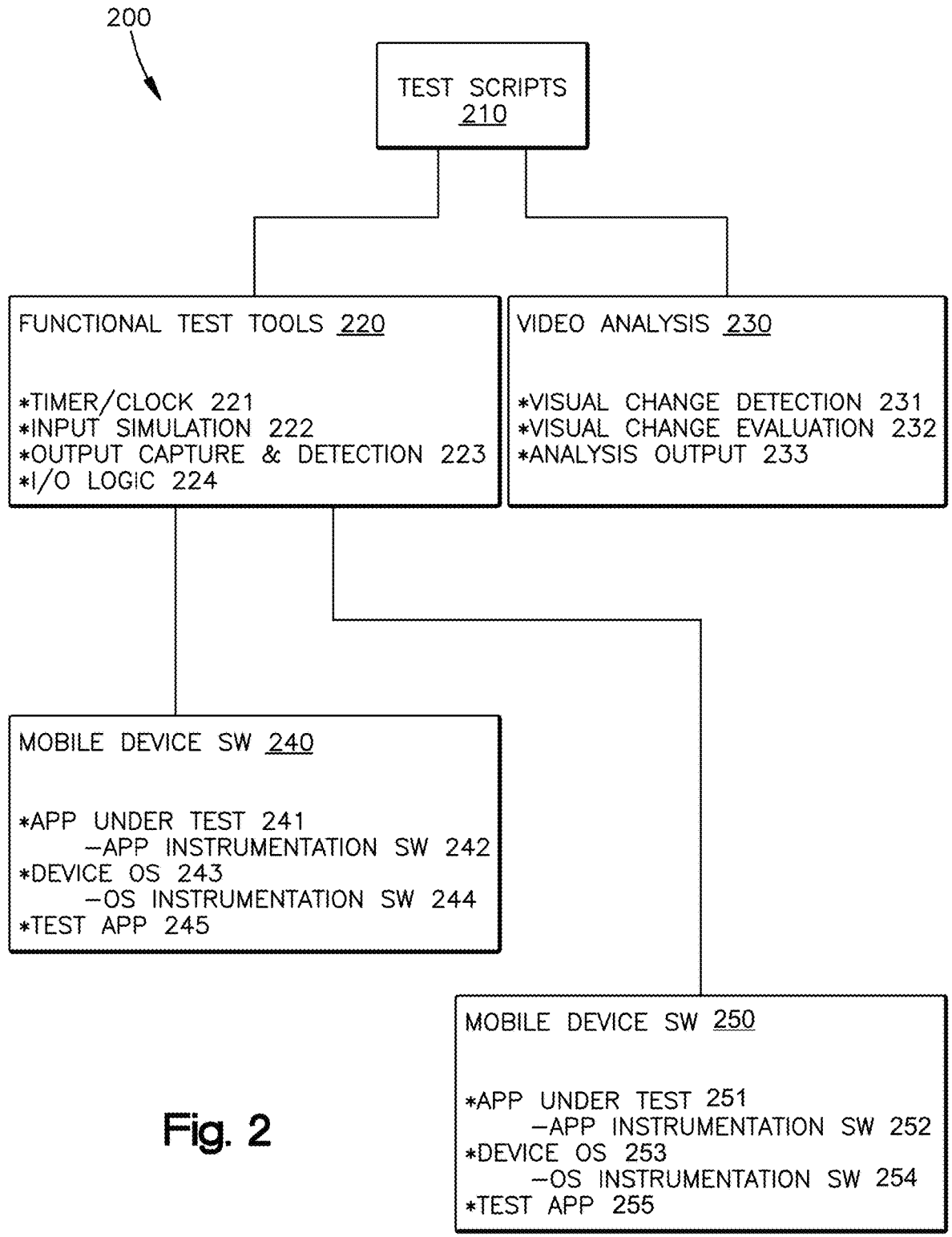
FIG. 2 is a software block diagram of an example user interface test system.

FIG. 2 is a software block diagram of an example user interface test system. User interface test system 200 includes test scripts 210, functional test tools 220, mobile device software 240 and 250, and video analysis 230. Test scripts 210, functional test tools 220, and video analysis 230 are software that may be hosted on any computers such as cloud servers. They may be hosted on two separate severs such as test server 110 and video analysis server 120 as depicted in FIG. 1, but other segmentation is possible. Test scripts 210, functional test tools 220, and video analysis 230 are software may all be implemented on a single server or they may be divided onto three or more servers. Mobile device software 240, 250 may include software hosted on any device that also hosts the app-under-test, such as a smartphone.

Test scripts 210 may control what tests are run. This may include telling the functional test tools 220 which app on which device to be tested, and may indicate what function or feature of the app is to be tested. For example test scripts 210 may provide a fixed IP address, cell phone number, or other indication of a particular mobile device, and may identify the app to be tested. The feature of the app to be tested may be simply the startup or app launch process, or a feature within the app may be specified. An app feature may be specified, for example, by indicating a sequence of button clicks along with an indication of when to start and stop recording of screen video.

An app feature to be tested may also be specified by causing the app to assume or transition to a certain internal state before starting video recording of the screen. An app certain internal app state may be indicated in test scripts 210 as a uniform resource locator (URL) specified. For example, "syw://home" may indicate navigating the user interface of an app registered as "syw" to a user interface screen named "home." "Home" may indicate the default screen presented to a user immediately after an app has completed launching. In another example "abcd://app_state_X" may indicate navigating an app registered as "abcd" to an app state named "app_state_X." An app state URL may be passed from test scripts 210 to functional test tools 220 to instrumentation software on a test device, such as test app 245 or OS instrumentation SW 244. An app on mobile device 240 may register a URL name for itself such as "syw" or "abcd" on the on the mobile device, for example when the app is first installed on the mobile device. Then the instrumentation software on the device can identify which app is referred to in the URL by looking up the beginning on the URL in the registration list local to the device. If that app is already launched, the URL can be passed to the app by the test app 255 or OS instrumentation software 254. In embodiments, app instrumentation SW 252 will be configured to receive such a URL and navigate the app-under-test 241 to the app state or user interface state specified by the URL.

Functional test tools 220 may include a timer or clock 221 for controlling input to the app-under-test and measuring times of output from the app-under-test; input simulation 222 for simulation of a input to an app-under-test from a human user; output capture and detection 223 for detection and/or capturing of output from the app-under-test; and input/output (I/O) logic 224. Output capture and detection 223 may include capturing all or a portion of the mobile device's display screen as a still or moving (video) image, but may also include capturing other output from the app-under-test, such as audio output, or communication between the device's operating system and the app-under-test. Communication between the app-under-test and the device's operating system may include notifications that are not visible via the app's visual UI, for example notification of an app launch completion and notification of an app termination. I/O logic may link output detection 223 to input simulation 222 during execution of test script 210. For example, simulating the clicking of a button in the app UI may be triggered after detection of the display of the button in the app UI.

Functional test tools 220 may include the ability to cause the installation of an app-under-test, such as app-under-test 241. For example, upon receiving an instruction from functional test tools 220, mobile device instrumentation software, such as test app 245 or OS instrumentation SW 244, may instruct the device OS 243 to install app-under-test 241 from a cloud server.

The video analysis 230 software component may analyze video captured from the screen of the app-under-test. Video analysis 230 software may include functions for visual change detection 231; visual change evaluation 232; and analysis output 233. The visual change detection function may include detecting changes in a video, identifying the time at which changes start or stop. The visual change evaluation 232 function may evaluate the detected changes in a video, for example identifying the percentage of total change that is completed at various times during the video. Such a percentage may be determined by identifying the number of pixels in a frame of the video that are the same or different from the final frame of video (the frame after and detected changes has stopped). The analysis output 233 may produce a summary or quality rating based on the results of the visual change evaluation 232 function.

Mobile device software 240 and 250 may include the various software components running on a test device. A test device is a computing device that hosts the app-under-test, such as mobile device 130 or 140 of FIG. 1. This includes the app itself, app-under-test 241, 251; app instrumentation software 242, 252; mobile device operating system 243, 253; operating system instrumentation software 244, 254; and a test app 245, 255. All of these mobile device software components may be optional depending on the test configuration. App under test 241, 251 may be native code, which is instructions in the format native to a processor in the mobile device, and may use the services of, or be customized to run in the environment of, the device OS 243, 253. Alternately, the app-under-test 241, 251 may include instructions in a higher-level language that is executed by an interpreter (not depicted), where the interpreter includes instructions native to a mobile device processor. For example, the app may be in hypertext markup language (HTML) where the interpreter is a web browser, or the app may be JavaScript instructions where the interpreter is a JavaScript interpreter. In some embodiment, the app-under-test 241, 251 may simply be a web page rendered by a web browser included with the device OS 243, 253. The device OS, 243, 253 may be, for example, APPLE iOS, GOOGLE Android, or MICROSOFT WINDOWS Mobile.

The test device may include test software added to the test device for testing or debugging purposes. This test software may include one or more of: app instrumentation software 242, 252; OS instrumentation software 244, 254; and test app 245, 255. Test software may communicate with functional test tools 220 and may or may not be hosted on the same computer as the functional test tools 220.

App instrumentation software 242, 252 may be code customized for interaction with the app-under-test 241, 251, and may include, for example, code that is statically or dynamically linked to the app-under-test 241, 251. OS instrumentation software 244, 254 may be code customized for interaction with the device OS 243, 253, and may include, for example, code that is statically or dynamically linked to the device OS 243, 253. Test software on the mobile device may also include a free-standing test app 245, 255 that may, for example, run in its own address space and not be linked into the address space of either the device OS 243, 253 or the app-under-test 241, 251. Test app 245, 255 may programmatically interact with the app-under-test 241, 251 and/or the device OS 243, 253 to, for example, simulate user input or detect and capture app output. A device OS or an app-under-test may expose programmatic interfaces for causing input to an app-under-test and detect or capture output from an app-under-test.

In some embodiments, software under test, such as app-under-test 241, 251, may be modified to include all or portions of the test software. Addition of the test software in an app image or binary package may be referred to as "instrumenting" the app to be tested. App instrumentation software 242, 252 is an example of test software added to the app-under-test 241, 251. It is not uncommon to modify the source code of an app to facilitate testing or debugging the app. For example, an app may be instrumented to output some text in a debugging application (a "debugger") when the debugger is attached to the app when the app is running on a computer system. For example, the text output to the debugger may indicate when a certain point in the app code is being executed, when a certain app state is achieved, or the text output include the value of one or more state variables.

In some situations, modification of source code is undesirable or infeasible. For example, modification of source code by adding test software in some cases may affect the performance of the software under test, hence making measurement of that performance unreliable. In other cases, the source code may not be available when a test is created. In these cases, test software may be linked to the object code of app to create an instrumented app. In this way, the source code of the app need not be modified for the test in that the source code for the app does not include any instrumentation for the test; instrumentation software is included after compilation by linking object code instrumentation. Such object-code-level instrumentation may operate by the test software intervening or "hooking" interactions between the original app code and some aspect of the computer on which the instrumented app will run. For example the test code may hook requests from the app for particular operating system services or hardware services of the computer on which the instrumented app will run. A hooked request for a service, may, for example, record the time the request was made, and then pass on the request to the actual operating system service or hardware service being requested.

In other embodiments, instead of instrumenting an app, the computer on which an app will be tested can be instrumented. Embodiments that do not include modification of the app-under-test to customize it for either test scripts 210 or functional test tools 220 enables testing of apps that are not easily modified, for example because app source code is not available. Not modifying the app-under-test may also be preferable because such modifications may affect the performance of the app being measured in unpredictable ways. A computer can be instrumented by adding test software to the computer on which an app will be tested (the test computer) outside of the app itself. This may be done, for example, by modifying the operating system of the test computer. For example, device OS 243, 253 may be instrumented by adding OS instrumentation software 244, 254. Test software of such an instrumented operating system may intervene or hook interactions between an application under test and the operating system or interactions between the application under test and the hardware (such as the I/O devices or the processor) of the test computer. In some cases, the operating system may have a controllable mode of operation where the OS instrumentation software is enabled or disabled based on the mode setting, such that the test software intervenes in interactions with an app or not, depending on the mode setting. Test code may be statically linked, for example, by linking app object code (or OS object code) with test object code to create an app's (or OS's) binary image of native processor executable code.

In an example embodiment, test script 210 may test an app's launch time by specifying to functional test tools to launch app-under-test 241, 251 on a specified mobile device. The functional test tools 220 may then connect to the specified mobile device, and further connect to OS instrumentation software 244, 254 running on that mobile device. Functional test tools 200 may then instruct OS instrumentation tools to start recording what is displayed on the mobile device screen as a video and then to launch app-under-test 241, 251. When the test is completed, for example after a fixed number of seconds specified in the test script 210 or when the device OS 243, 244 indicates that launch of app-under-test 241, 251 has completed launching, the OS instrumentation software 244, 254 may stop the video recording and send the recorded video back to the functional test tools 220. Test script 210 may then specify sending the captured video to video analysis 230 software hosted on another video analysis cloud server. The video analysis 230 software may analyze the video to determine, for example, one or more app launch duration metrics and user experience metrics.

In another example embodiment, test script 210 may test a function or feature of an app by instructing to the functional test tools to launch an app-under-test 241, 251 on a specified mobile device. The functional test tools 220 may then connect to the specified mobile device, and further connect to OS instrumentation software 244, 254 running on that mobile device. Functional test tools 220 may then instruct OS instrumentation tools to launch app-under-test 241, 251 and then to start recording what is displayed on the mobile device screen as a video. Functional test tools may then specify starting the app feature to be tested by navigating the UI of the app-under-test 241, 251. For example OS instrumentation tools 244, 254 may specify simulating user selection of the buttons and menu selections of the app UI that starts execution of the app feature. When the test is completed, for example after a fixed number of seconds specified in the test script 210, the OS instrumentation software 244, 254 may stop the video recording and send the recorded video back to the functional test tools 220. Test script 210 may then specify sending the captured video to video analysis 230 software hosted on another video analysis cloud server. The video analysis 230 software may analyze the video to determine, for example, the time the app took to complete updating the screen during execution of the app feature or other related user experience metrics.

In some embodiments, evaluation of an app's user interface may produce multiple different metrics from a single video. For example, one metric may evaluate the area under a curve plotting the change of all pixels in a video of a user interface, while a second metric may weight certain pixels at certain times differently. The first metric may not require any knowledge of a particular user interface, while the second metric may use knowledge of a particular user interface to weight a portion the video, such as the upper left-hand quarter of the screen, over the remainder of the video. In other embodiments, another example weighting of portions of a video may be based on known most frequently used user interfaces. For example, a heat map may indicate which pixels are most interesting to a user. A heat map may be derived from a click map that measures which areas of a user interface are most frequently clicked on, or may be derived from the portions of a user interface a user scrolls, or, with eye tracking ability, may be derived from the portions of a user interface that a user looks at most. A heat map may also be inferred, for example, from the colors of pixels where brighter or sharper colors are more likely to be noticed and hence may predict that those colors are more likely to be noticed by a user, and hence the pixels with those colors are more visually important to a user. In embodiments with such heat maps, a user interface that more quickly renders the pixels in the heat map may be considered to have a higher user experience metric.

Other embodiments may also be applied as part of an experience metric. For example, a crowd source technique could be employed that provided a set of test users with a version of the UI and ask to provide a quality rating or users could be asked to provide a level of importance to a particular portion of a user interface. In other embodiments, a portion of a screen that provides buttons for user input would be weighted higher than portions of a screen that provide design elements that provide little or no functionality. Two or more of the described embodiments may also be used in various combinations to provide an overall metric.

In some embodiments, evaluation of an app's user interface may be done by a pluggable software component. For example, visual change evaluation software 232 may be pluggable in that it may be replaced with alternate software components that do a different visual change evaluation of a video of a user interface. In alternate embodiment, pluggable visual change evaluation may be done in software included with functional test tools, for example using evaluation data produced by video analysis 230 software.

Figure 3:
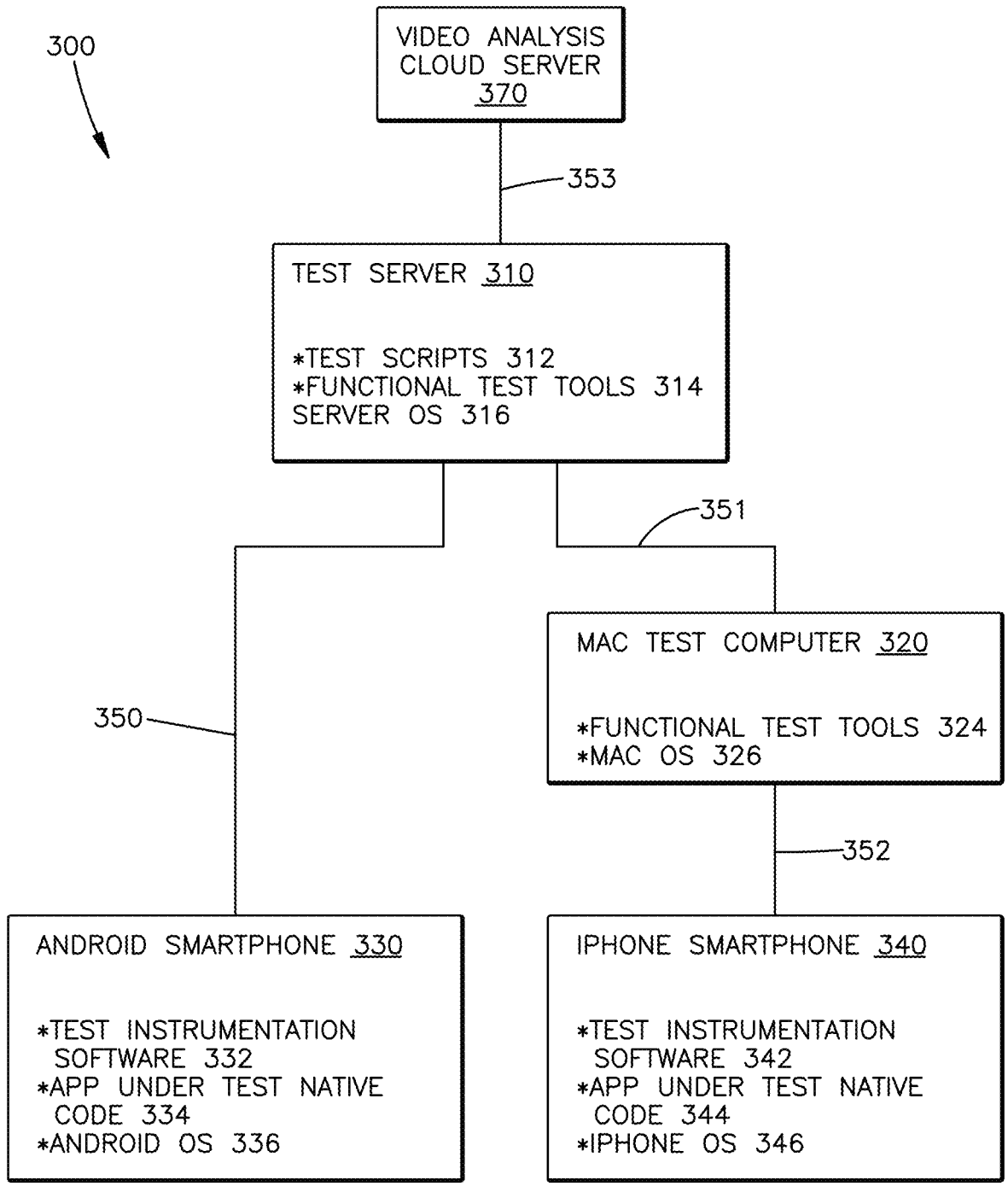
FIG. 3 depicts an example system for software user interface performance testing on Android and iOS smartphones.

FIG. 3 depicts an example system for software user interface performance testing on Android and iOS smartphones. In this example, a test server 310, comprising test scrips 312, functional test tools 314, and a server OS 316, may be a cloud-based server connected via network connections 350, 351, 353 to Android smartphone 330, Mac test computer 320, and video analysis cloud server 370. Connections 350, 351, and 353 may be the Internet connections, and Android smartphone 330 may have a fixed IP address. Android smartphone 330 may include test instrumentation software 332, app-under-test native code 334, and an Android OS 336. Mac test computer 320 may be a desktop or mobile APPLE Mac computer comprising functional test tools 324, and Mac OS 326. Mac test computer 320 may be connected to IPhone 340 via connection 352 with a wired USB or APPLE Lighting connector. IPhone 340 may comprise test instrumentation software 342, app-under-test native code 344, and APPLE iOS 346 operating system. Videos of the screen of Android smartphone 330 and IPhone 340 may be analyzed by video analysis cloud server 370 to determine user experience metrics of the apps under test.

Figure 4:
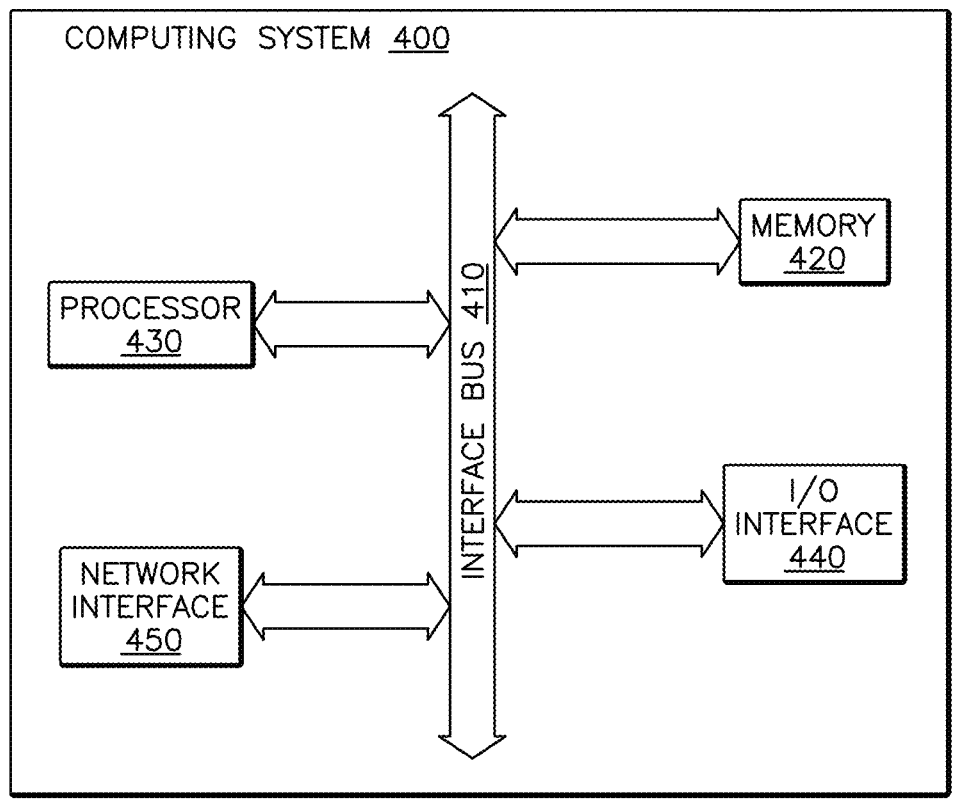
FIG. 4 is a block diagram of an example general-purpose computing system in which embodiments of the invention may be implemented.

FIG. 4 is a block diagram of an example general-purpose computing system 400 in which embodiments of the invention may be implemented. For example, test server 110, video analysis server 120, and mobile devices 130, 140 of FIG. 1 may be implemented on a computer including elements of a computer system 400. As depicted, computing system 400 includes bus 410 that directly or indirectly couples at least the following components: memory 420, one or more processors 430, I/O interface 440, and network interface 450. Bus 410 is configured to communicate, transmit, and transfer data, controls, and commands between the various components of computing system 400.

Computing system 400 typically includes a variety of computer-readable media. Computer-readable media can be any available media that is accessible by computing system 400 and includes both volatile and nonvolatile media, removable and non-removable media. Computer-readable media may comprise both computer storage media and communication media. Computer storage media does not comprise, and in fact explicitly excludes, signals per se.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information and which can be accessed by computing system 400.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 420 includes computer-storage media in the form of volatile and/or nonvolatile memory. The memory may be removable, non-removable, or a combination thereof. Memory 420 may be implemented using hardware devices such as solid-state memory, hard drives, optical-disc drives, and the like. Computing system 400 also includes one or more processors 430 that read data from various entities such as memory 420, I/O interface 440, and network interface 450. In particular, each of devices test server 110, mobile device 130, 140, and video analysis server may store computer readable instructions in memory 420 that upon execution by one or more processors 430 would reconfigure the device into a specific specialized device.

I/O interface 440 enables computing system 400 to communicate with different peripherals, such as a display, a keyboard, a mouse, etc. I/O interface 440 is configured to coordinate I/O traffic between memory 420, the one or more processors 430, network interface 450, and any peripherals. Network interface 450 enables computing system 400 to exchange data with other computing devices via any suitable network (e.g. network 350 and connection 351 of FIG. 3).

Figure 5:
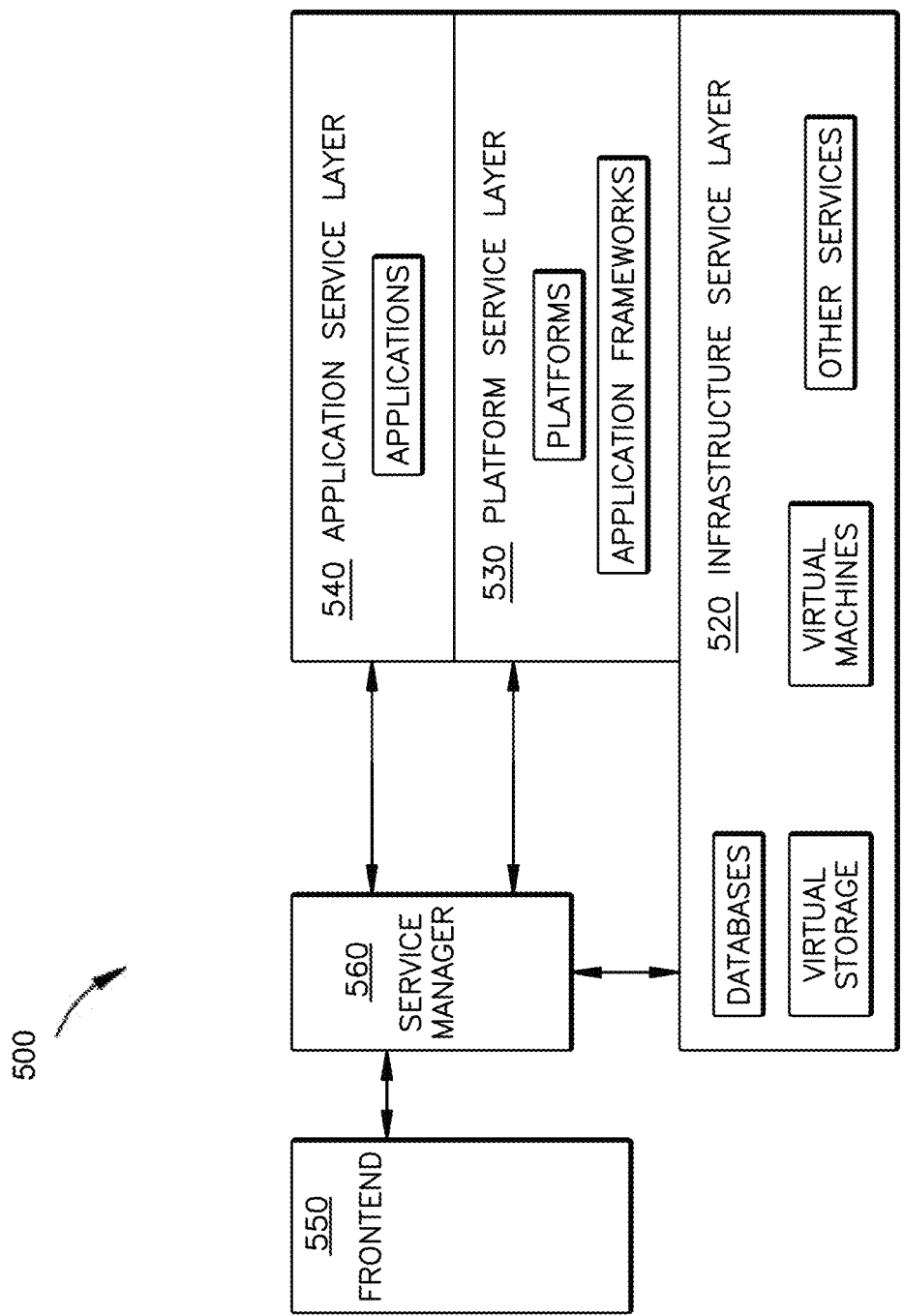
FIG. 5 is a schematic diagram illustrating an example cloud-based server that may be used in accordance with the present disclosure.

FIG. 5 is a schematic diagram illustrating an example cloud-based server 500 that may be used in accordance with the present disclosure. Cloud-based server 500 may provide infrastructure services, platform services, and software application services. In an embodiment, cloud-based server 500 is used to implement at least a portion of test server 110 of FIG. 1 and test server 310 and video analysis cloud server 370 of FIG. 3. The infrastructure services may include virtualized resources, such as virtual machines, virtual storage, and so on. Each of these infrastructure services may be deployed in an infrastructure service layer 520. Applications in the application service layer 540 may include functional test tools 220, test scripts 210, and video analysis 230 software. Although FIG. 5 depicts this as a cloud service, the system may in the alternative be on premises or a mix of cloud and on premises.

The scale and various aspects, such as data, connectivity, and dependency relationships within and between service components, of an infrastructure service deployment may be configurable by an administrator user. For instance, an administrator user may submit a configuration specification to cloud-based server 500 via a frontend interface 550 and service manager 560. The configuration specification can be translated into infrastructure and kernel level API calls that create, re-create, move, or delete components such as virtual machines and services, and assign or change attributes of the components.

In addition to the infrastructure services, cloud-based server 500 may also provide platform services, such as an environment for running virtual machines or a framework for developing and launching a particular type of software applications. Platform services may be implemented in a platform service layer 530 over the infrastructure service layer 520, and may employ one or more infrastructure services configured in a particular manner. Configuration of platform services can be accomplished by program code written according to the APIs of the platform services and, optionally, the APIs of the infrastructure services that are employed in enabling the platform services.

In some examples, cloud-based server 500 may also provide software application services in an application service layer 540. A software application can be installed on one or more virtual machines or deployed in an application framework in the platform service layer 530. The software application can also communicate with one or more infrastructure service components, such as databases, in the infrastructure service layer 520. The installation and configuration of the software application in the application service layer 540 can be accomplished through APIs of the software itself and the APIs of the underlying platform and infrastructure service components.

Depending on the type of services, a cloud-service user may be granted different levels of control in configuring the services. For example, if a software application service is employed, an administrator user is given control over how the software application is configured. If a platform service is employed, an administrative user is given control over how the platform and/or application frameworks are configured. Similarly, if infrastructure services are employed, an administrative user is given control over the particular infrastructure services employed.

Figure 6:
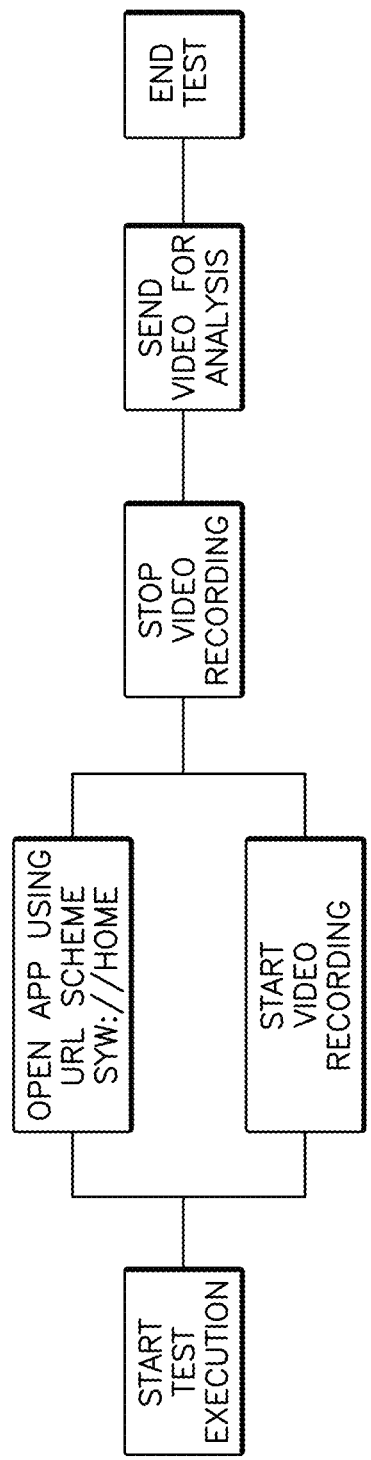
FIG. 6 is an example flowchart for analyzing an app.

FIG. 6 is an example flowchart for analyzing an app. Test execution starts on the left of the figure and moves to the right through the process boxes depicted. As depicted, the video start recording simultaneously with remotely opening (launching) the app with a URL scheme "syw://home." Alternate embodiments may start recording before or after the start of opening the app. Video recording is then stopped in the next box, for example after recording a predetermined duration of video or after a number of app functions have been performed. In the next box, the video is sent for analysis, which may determine a last changed frame in the video and a Speed Test rating that estimates a human's perceived performance experience if a human were watching the screen as the test was performed. And finally, the test ends.

Figure 7:
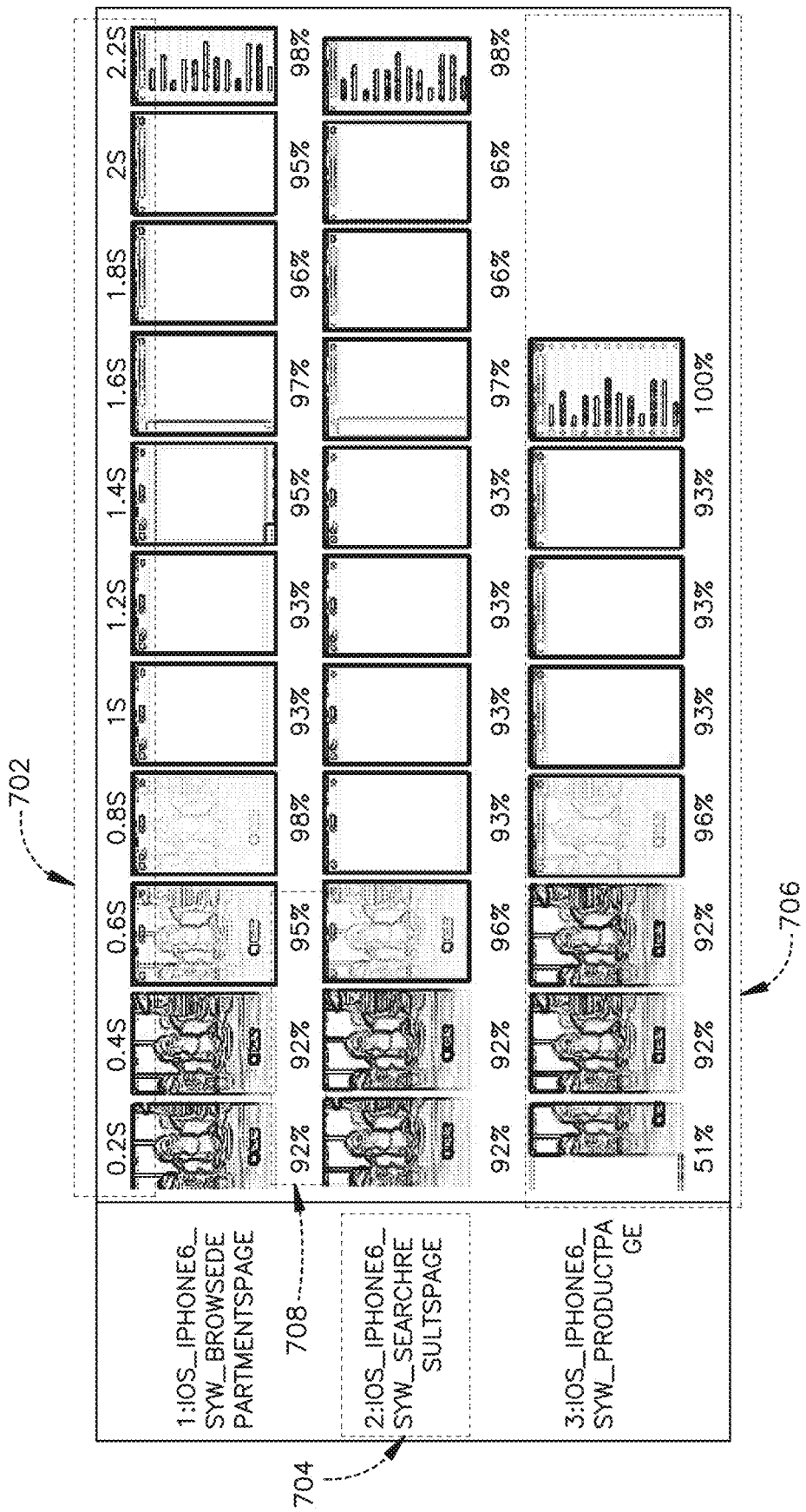
FIG. 7 is a video timeline with three example videos.

FIG. 7 is a video timeline with three example videos. Each horizontal row of the figure represents the results of one test process, such as the process of FIG. 6 or one iteration of the process of FIG. 10. Each row includes the name of the test on the left (such as element 704), a test film strip (such as element 706) including a sequence of images at sampled at 0.2 second intervals from the video created during the test process, and a rating of each of the sampled images immediately below each sampled image. In the embodiment of FIG. 7, the ratings are an estimate of perceived visual completion of the task or feature being tested for each of the image samples. The first image (left-most image) may correspond to the time when the recording started and just before or simultaneous with, the start of execution of the feature being tested. The last image (right-most image) in each row may be the image corresponding to when video analysis determined visual changes were completed for the app testing process.

FIG. 8 is an example list of tests with speed index ratings. Each row represents one app test process, including, from left to right: a Video ID indicating a video filename of the video captured during the test, the time of the test, the name of the test or test script that was run (including the type of mobile device and mobile device operating system used in that test), a Speed Index rating, and a Last Visual Change number resulting from analysis of the video. Speed Index ratings and Last Visual Change ratings may be measured in milliseconds and may correspond to a time along the video's timeline.

Figure 9:
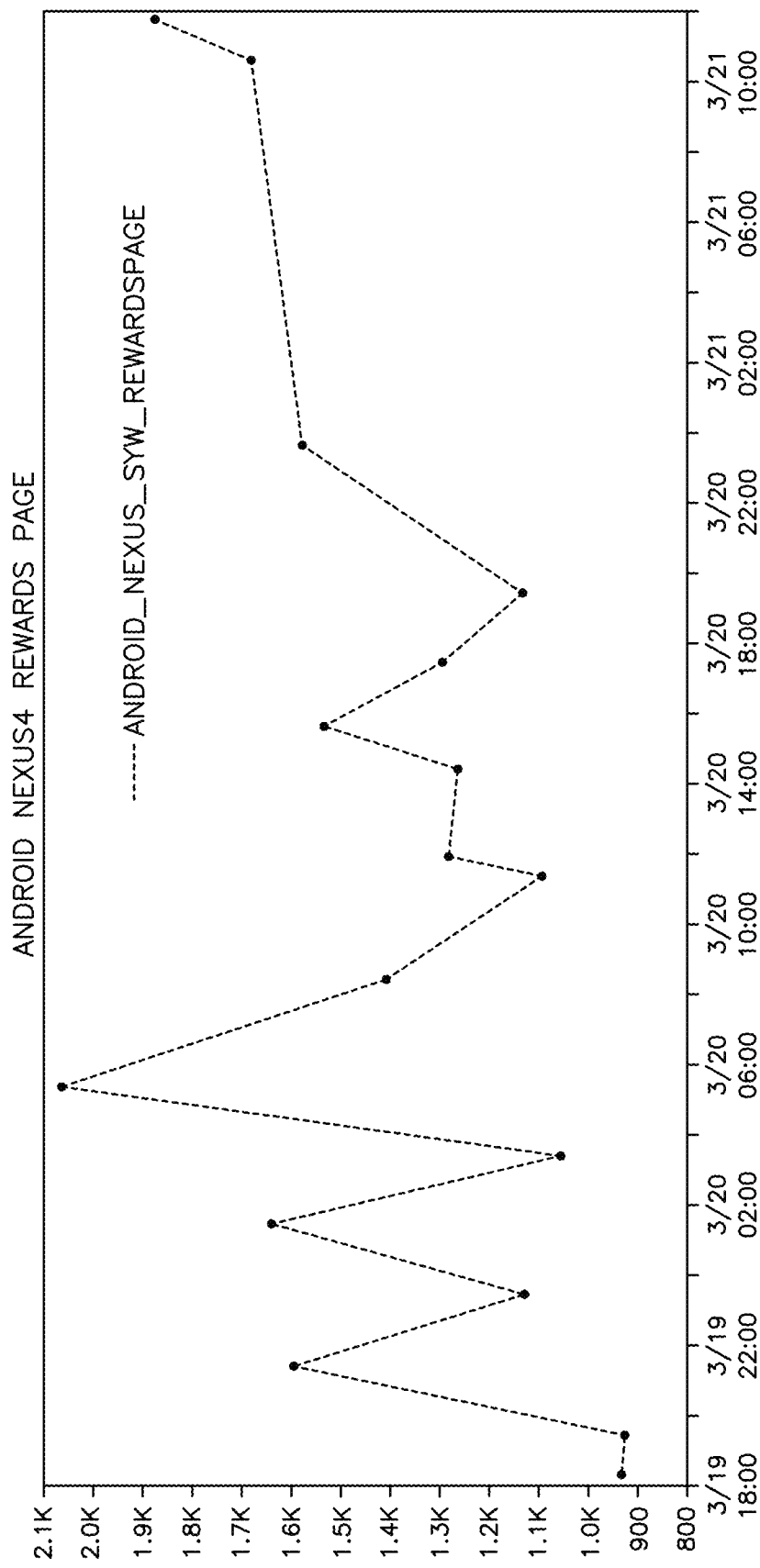
FIG. 9 is a graphic rating for the same test run at different times.

FIG. 9 is a graphic presentation of analysis results for the same test run at different times. For example, FIG. 9 may represent a series of tests run on the same device with the same app-under-test, but run at different time. Such a test may demonstrate performance difference that are not caused by the app-under-test itself, but rather represent differences in resources used by the app-under-test, such as a network bandwidth resource or an internet server resource. The embodiment of FIG. 9 graph shows a performance rating, such as the Speed Index column of FIG. 8, on the vertical axis, for the process of FIG. 6 run at different times over a few days along the horizontal axis, from March 2019 at 18:00 till March 2021 at 10:00.

Figure 10:
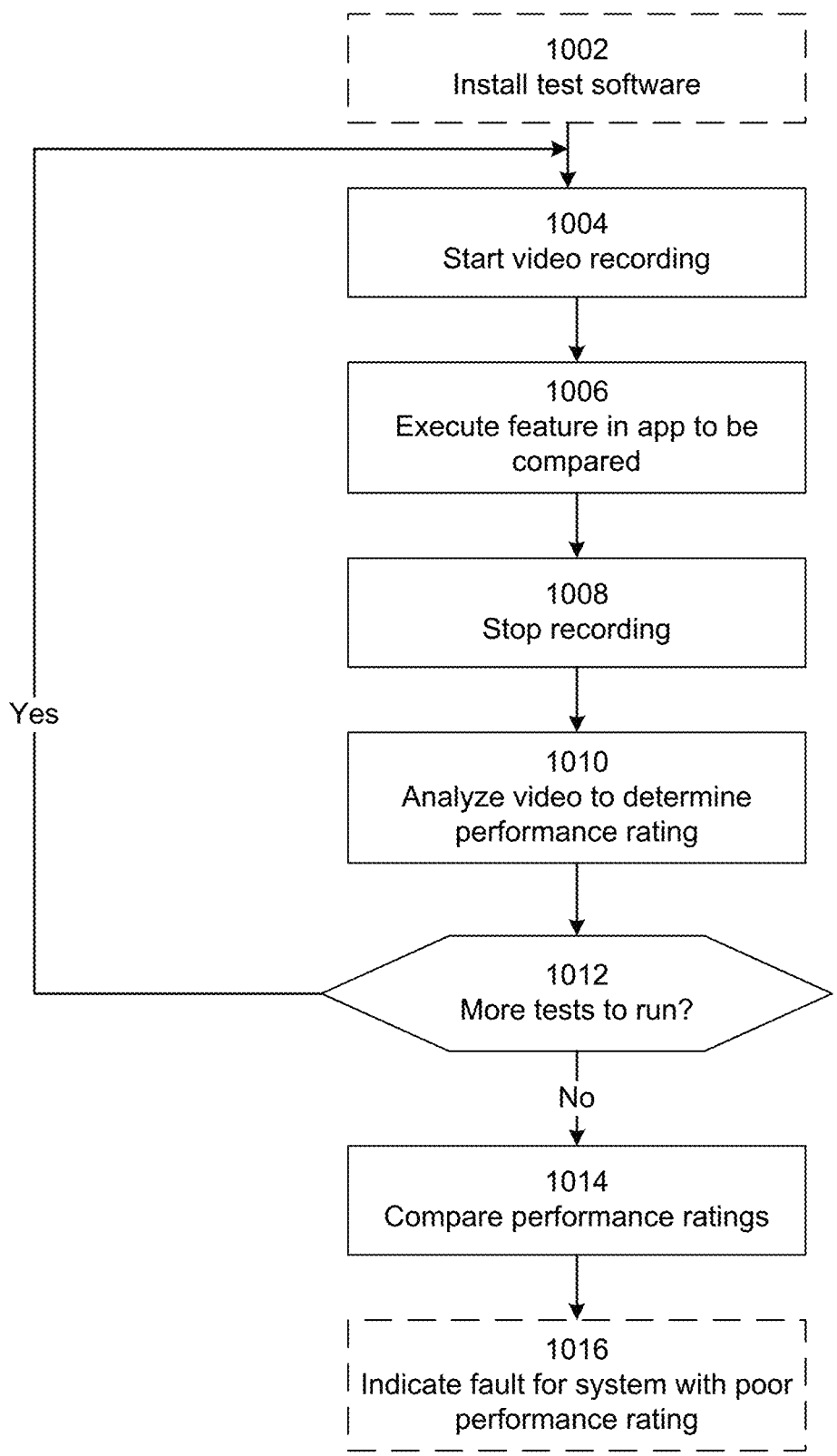
FIG. 10 is a flowchart for comparing performance test results.

FIG. 10 is a flowchart for comparing performance test results. At optional step 1002, test software is installed on one or more a test devices that will be used to test an app-under-test. The test software may, for example, any of test app 245, OS instrumentation software 243, and app instrumentation software 242 of FIG. 2. A video recording of the user interface of the app-under-test is started in box 1004, including audio and/or video output from the app-under-test. The video recording may include the entire display of the device running the app-under-test. In box

1006, execution is initiated for the feature to be tested of the app-under-test. In some cases the feature may simply the startup of the app-under-test, in other cases the feature may be a portion of the app-under-test generally accessible via navigation of the user interface. Box 1006 may be performed by instructing the device under test to navigate to a URL specifying the app-under-test and optionally the feature to be tested of the app-under-test. When execution of the feature is complete or estimated to be complete, video recording may be stopped in box 1008. The recorded video is analyzed in box 1010 to determine a performance rating, for example by calculating a visual speed index based on changes to co-located pixels of the video over time. In box 1012, if there are additional tests to run, for example on a different device, with a different version of the app-under-test, or with a different version of an operating system on the device under test, the process continues at box 1004. Alternately, if all tests have been run, the performance ratings determined in box 1010 during multiple iterations can be compared. In optional box 1016, if the process of FIG. 10 is a regression test, fault may be indicated if a test of a newer system has a worse performance rating than a test of an older system.

In alternate embodiments, test results are stored for later comparison. For example, the same test on the same device with the same app may be run at different times. Running the same test at different times may provide a comparison of some system an app-under-test relies upon, such as the Internet or a server that provides data to the app under test. Running the same test at different times may also eliminate some noise in test measurement, for example by averaging the performance results of the same test run once an hour for several hours.

It should be understood that the various techniques described herein may be implemented in connection with hardware or software or, where appropriate, with a combination of both. The subject matter presented herein may be implemented as a computer process, a computer-controlled apparatus or a computing system or an article of manufacture, such as a computer-readable storage medium. The techniques, or certain aspects or portions thereof, may, for example, take the form of program code (i.e., instructions) embodied in tangible storage media or memory media implemented as storage devices, such as magnetic or optical media, volatile or non-volatile media, such as RAM (e.g., SDRAM, DDR SDRAM, RDRAM, SRAM, etc.), ROM, etc., that may be included in computing devices or accessible by computing devices. When the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device.

One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

What is claimed:

1. A method for testing software, comprising:
   recording of a display on a first mobile device as a first video during a first test including execution of at least one feature of a first version of a first app-under-test;
   determining a first performance rating based on analysis of the first video including detection of visual changes over time in the first test from the first video;
   recording of the display on a second mobile device as a second video during a second test including execution of the at least one feature of a second version of a second app-under-test;
   determining a second performance rating based on analysis of the second video including detection of visual changes over time in the second test from the second video;
   comparing the first and second tests based on the first performance rating and the second performance rating;
   wherein the first performance rating and the second performance rating are visual speed ratings and the performance rating is visual speed index;
   wherein the first and second performance ratings are based on an estimate of human visual perception of changes over time in the video being analyzed;
   wherein list of tests with speed index ratings comprising many rows, each row represents one app test process including: a video identifier indicating video filename of the video captured during the test, the date and time of the test, the name of the test was run which including the type of mobile device and mobile device operating system used in that test, speed index rating, and a last visual change number resulting from analysis of the video; and evaluating including the analysis of the video recording of a user interface of the first app-under-test and second app-under-test produce multiple different metrics from the video, the different metrics comprising:

evaluate area under a curve plotting the change of all pixels in the video of the user interface and weight certain pixels at certain times differently wherein the weight certain pixels at the certain times use knowledge of a particular user interface to weight a portion the video, such that the upper left-hand quarter of a screen over the remainder of the video, a heat map indicated which pixels are most interesting to a user, the heat map derived from a click map that measures which areas of the user interface are most frequently clicked on, or derived from the portions of the user interface a user scrolls, or with eye tracking ability derived from the portions of a user interface that a user looks at most and wherein heat map inferred from the colors of pixels and render the pixels considered to have a higher user experience metric, and a portion of a screen that provides buttons for user input is weighted higher than portions of a screen that provide design elements that provide no functionality.

2. The method of claim 1, wherein further comprising: generating an indication of a fault based on the comparing.

3. The method of claim 1, wherein the first mobile device includes a first operating system, the first operating system includes test instrumentation, and the first app-under-test is not modified for the first test; and further comprising:

sending an instruction to the test instrumentation on the first device to launch the first version of the app-under-test and to navigate to the at least one feature of the first app-under-test.

4. The method of claim 1, wherein:
the first and second mobile devices are the same device, the first and second apps-under-test are the same, and the first and second versions of apps-under-test are not the same.

5. The method of claim 1, wherein:
the first and second mobile devices are the same model of device and not the same device, and the first and second versions of the app-under-test are the same versions.

6. The method of claim 1, wherein:
the first and second mobile devices are the same device, and first and second apps-under-test are not the same, and the at least one feature of a first version of a first app-under-test is the same as the at least one feature of a second version of a second app-under-test.

7. The method of claim 1, further comprising:
initiating the first test by providing to the first mobile device a uniform resource locator (URL) indicating the first version of the app-under-test and further indicating the at least one feature of the first app-under-test; and
initiating the second test by providing to the second mobile device a URL indicating the second version of the app-under-test and further indicating the at least one feature of the second app-under-test.

8. A system for testing an app, comprising:
a test server including a test script;
a video analysis server;
a first mobile device including test software and a first version of an app-under-test;

a second mobile device includes test software and a second version of the app-under-test first test software; and wherein the test script causes:

recording of a display on the first mobile device as a first video during a first test including execution of at least one feature of the first version of the app-under-test;

determining a first performance rating based on analysis of the first video including detection of visual changes over time in the first test from the first video by the video analysis server;

recording of the display on the first second mobile device as a second video during a second test including execution of the at least one feature of the second version of the app-under-test;

determining a second performance rating based on analysis of the second video including detection of visual changes over time in the second test from the second video by the video analysis server; and comparing the first and second versions of the app-under-test based on the first performance rating and the second performance rating;

wherein the first performance rating and the second performance rating are visual speed ratings and the performance rating is visual speed index;

wherein the first and second performance ratings are based on an estimate of human visual perception of changes over time in the video being analyzed;

wherein list of tests with speed index ratings comprising many rows, each row represents one app test process including: a video identifier indicating video filename of the video captured during the test, the date and time of the test, the name of the test was run which including the type of mobile device and mobile device operating system used in that test, speed index rating, and a last visual change number resulting from analysis of the video; and evaluating including the analysis of the video recording of a user interface of the first app-under-test and second app-under-test produce multiple different metrics from the video, the different metrics comprising:

evaluate area under a curve plotting the change of all pixels in the video of the user interface and weight certain pixels at certain times differently wherein the weight certain pixels at the certain times use knowledge of a particular user interface to weight a portion the video, such that the upper left-hand quarter of the screen over the remainder of the video, a heat map indicated which pixels are most interesting to a user, the heat map derived from a click map that measures which areas of the user interface are most frequently clicked on, or derived from the portions of the user interface a user scrolls, or with eye tracking ability derived from the portions of a user interface that a user looks at most and wherein heat map inferred from the colors of pixels and render the pixels considered to have a higher user experience metric, and a portion of a screen that provides buttons for user input is weighted higher than portions of a screen that provide design elements that provide no functionality.

9. The system of claim 8, wherein the test script further causes: generating an indication of a fault based on the comparing.

10. The system of claim 8, wherein:
the first mobile device includes a first operating system;

the first test software includes instrumentation of the first operating system;

and the first app-under-test is not modified to work with the test script.

11. The system of claim 8, wherein:

the first and second mobile devices are the same device, and the first and second versions of the app-under-test are not the same.

12. The system of claim 8, wherein:

the first and second mobile devices are the same model of device and not the same device, and the first and second versions of the app-under-test are the same versions.

13. The system of claim 8, wherein:

the test script includes a URL indicating the first version of the app-under-test to be executed during the first test, and further indicating the at least one feature of the first app-under-test.

14. A computer readable memory containing instructions executable by a processor, the instructions causing:

recording of a display on a first mobile device as a first video during a first test including execution of at least one feature of a first version of an app-under-test;

determining a first performance rating based on analysis of the first video including detection of visual changes over time in the first test from the first video;

recording of the display on a second mobile device as a second video during a second test including execution of the at least one feature of a second version of the app-under-test;

determining a second performance rating based on analysis of the second video including detection of visual changes over time in the second test from the second video;

comparing the first and second tests based on the first performance rating and the second performance rating;

wherein the first performance rating and the second performance rating are visual speed ratings and the performance rating is visual speed index;

wherein the first and second performance ratings are based on an estimate of human visual perception of changes over time in the video being analyzed;

wherein list of tests with speed index ratings comprising many rows, each row represents one app test process including: a video identifier indicating video filename of the video captured during the test, the date and time of the test, the name of the test was run which including the type of mobile device and mobile device operating system used in that test, speed index rating, and a last visual change number resulting from analysis of the video; and evaluating including the analysis of the video recording of a user interface of the first app-under-test and second app-under-test produce multiple different metrics from the video, the different metrics comprising:

evaluate area under a curve plotting the change of all pixels in the video of the user interface and weight certain pixels at certain times differently wherein the weight certain pixels at the certain times use knowledge of a particular user interface to weight a portion the video, such that the upper left-hand quarter of the screen over the remainder of the video, a heat map indicated which pixels are most interesting to a user, the heat map derived from a click map that measures which areas of the user interface are most frequently clicked on, or derived from the portions of the user interface a user scrolls, or with eye tracking ability derived from the portions of a user interface that a user looks at most and wherein heat map inferred from the colors of pixels and render the pixels considered to have a higher user experience metric, and a portion of a screen that provides buttons for user input is weighted higher than portions of a screen that provide design elements that provide no functionality.

15. The computer readable memory of claim 14, wherein the instructions further cause:

generating an indication of a fault based on the comparing.

\* \* \* \* \*